United States Patent

Dukes

[15] 3,701,042
[45] Oct. 24, 1972

[54] D. C. MOTOR CIRCUIT FOR ROTATING A POLARIZER AND PROVIDING A DETECTOR SYNCHRONIZER SIGNAL FOR A LASER STABILIZING SYSTEM

[72] Inventor: John N. Dukes, Los Altos Hills, Calif.
[73] Assignee: Hewlett-Packard Company, Palo Alto, Calif.
[22] Filed: Feb. 3, 1970
[21] Appl. No.: 15,802

[52] U.S. Cl................................331/94.5, 318/138
[51] Int. Cl..............................................H01s 3/10
[58] Field of Search......................331/94.5; 318/138

[56] References Cited

UNITED STATES PATENTS

| | | | |
|---|---|---|---|
| 3,453,557 | 7/1969 | Polanyi | 331/94.5 |
| 3,532,037 | 10/1970 | Auphan | 350/7 |
| 3,453,514 | 7/1969 | Rakes et al. | 318/138 |
| 3,512,065 | 5/1970 | Fengler | 318/138 |
| 3,412,303 | 11/1968 | Rakes | 318/138 |

OTHER PUBLICATIONS

Collins et al., J. Appl. Phys. 33, (6) June 1962, pp. 2009-2011

*Primary Examiner*—Ronald L. Wibert
*Assistant Examiner*—R. J. Webster
*Attorney*—Roland I. Griffin

[57] ABSTRACT

A stabilizing circuit for a two frequency laser wherein the two modes of oscillation of the laser are converted by a quarter wave plate and a rotating polarizer into two separate components, the difference in intensity of these components serving to produce an error signal from a detector circuit synchronized with the rotating polarizer, the error signal controlling a piezoelectric transducer coupled to the cavity resonator of the laser to tune the laser. A brushless D.C. motor serves to rotate the polarizer and at the same time provide the synchronizing signals to the detector circuit.

10 Claims, 7 Drawing Figures

INVENTOR
JOHN N. DUKES
BY Roland I. Griffin
ATTORNEY

INVENTOR
JOHN N. DUKES
BY Roland J. Griffin
ATTORNEY

D. C. MOTOR CIRCUIT FOR ROTATING A POLARIZER AND PROVIDING A DETECTOR SYNCHRONIZER SIGNAL FOR A LASER STABILIZING SYSTEM

BACKGROUND OF THE INVENTION

A two frequency laser interferometer system is presently in use for accurately measuring distances, the two frequency output from the laser being obtained by the Zeeman splitting of the atomic resonance line by a unidirectional magnetic field directed along the axis of the laser plasma tube. This type of laser may be stabilized by measuring the difference in intensity or frequency of the two oscillating modes and creating an error signal dependent on said difference, this error signal being utilized to tune the cavity resonator to the center or atomic resonance frequency. The frequency difference cavity control method requires that a frequency modulation be introduced on the output beams.

The intensity difference cavity control method utilizes a quarter wave plate to convert the two oppositely circularly polarized beams to two orthogonal linearly polarized beams, these two orthogonal linearly polarized beams in turn being converted by a rotating polarizer into alternate, time-spaced components which may be detected by a suitable means such as a photodetector. Any difference in intensity between the two beams will appear as an A.C. component at twice the rotation frequency of the polarizer. This intensity difference is synchronously detected and the resulting D.C. difference value is fed to a piezoelectric transducer in the cavity resonator and on which one of the two reflector mirrors is mounted. The piezoelectric transducer will respond to the D.C. voltage to change the distance between the two reflecting mirrors and thus tune the cavity resonator to the center frequency. The major disadvantage of this technique is that it requires a motor for rotating the polarizer which is generally bulky and heavy and a generator means to drive the motor and also provide a synchronizing signal to the detector circuitry to synchronize the rotating polarizer with the detected output signal. It is difficult to design a motor driven from a generator source that will remain synchronized with the detector circuit.

BRIEF SUMMARY OF THE PRESENT INVENTION

The present invention relates to a novel apparatus which operates to rotate the polarizer of a two frequency intensity difference cavity control stabilization system and simultaneously generate the synchronizing signals utilized in the detector circuitry of the cavity control circuit.

This apparatus comprises a brushless D.C. motor provided with a hollow rotor to which the polarizer is attached. The rotor is mounted with the hollow rotor and the polarizer aligned with the two frequency beam from the laser, the beam passing through the polarizer and hollow rotor and impinging upon a first photocell. The output of the first photocell is transmitted through an A.C. amplifier to a detector circuit comprising a pair of switches. The rotor of the motor has a butterfly shape which interrupts a beam of light extending between a small light source and a second photocell, the light beam interruption occurring in alternate 90° portions of the rotation of the rotor. The output of the second photocell is transmitted through a D.C. amplifier to the poles of the D.C. motor to drive the rotor and also serves to drive the two switches in the detector to synchronize the output of the first photocell with the rotation of the polarizer. The output of the detector is transmitted through a D.C. amplifier to piezoelectric cavity tuning means in the laser to maintain the laser tuned to the center frequency.

The D.C. motor has a low mass and low vibration and is very thin or flat, inexpensive, self-starting, and generates the synchronizing signal which serves to synchronize the detector circuitry with the polarizer. This device thus serves to eliminate many of the undesirable characteristics of the intensity difference cavity tuning apparatus employed in two frequency lasers.

Description of the Preferred Embodiments of the Invention

Figure 1:
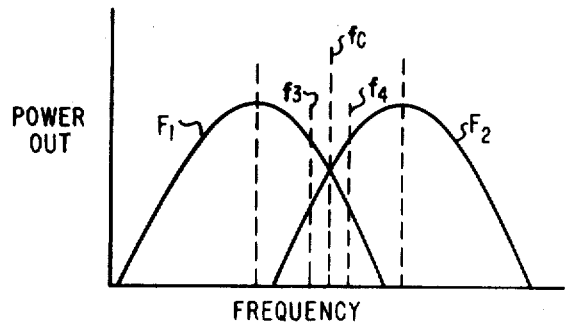
FIG. 1 is a plot of the power out versus frequency for the two oscillating modes of a two frequency laser.
Figure 2:
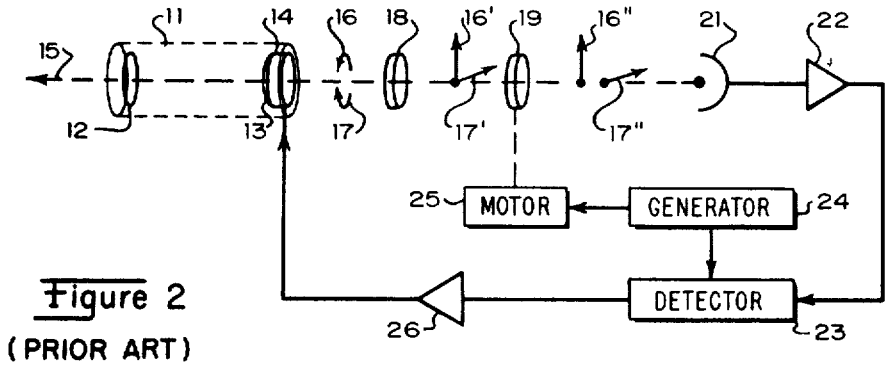
FIG. 2 is a block diagram of a known system for stabilizing the cavity resonator of the two frequency laser by an error signal obtained from the intensity difference between the two oscillating modes of the laser.

Referring now to FIG. 1 there is shown a plot of the output power versus frequency of the two modes of oscillation of a two frequency laser. These power or intensity curves are symmetrical about the center frequency $f_c$ of the cavity resonator of the laser and, when the cavity resonator is tuned to the exact center frequency, the power output of the two modes will be equal. When the cavity resonator tuning shifts off the center resonance frequency in one direction or the other, either the $F_1$ mode or the $F_2$ mode will increase in intensity depending upon the direction of the tuning shift and the other mode will decrease in intensity. For example, at frequency $f_3$, the intensity of the mode $F_1$ is greater than the intensity of the mode $F_2$ whereas at frequency $f_4$ the intensity of the mode $F_2$ is the larger. This difference in intensity is utilized to control the tuning of the cavity resonator to maintain it at the center frequency as shown in the system of FIG. 2.

The laser 11 includes the two beam reflecting mirrors 12 and 13, mirror 13 being fixedly secured on a piezoelectric transducer 14. The output 15 is taken from one end of the laser; a small portion of the output is also taken from the other end of the laser, this output comprising two oppositely circularly polarized beams represented by the circular components 16 and 17. This output is transmitted through a quarter wave plate 18 where the two oppositely polarized beams are converted to two orthogonal linearly polarized beams 16' and 17'. These two linearly polarized beams are transmitted through a rotating polarizer 19 which serves to separate them into two time-spaced components 16" and 17" which then impinge upon a photodetector 21. The output of the photodetector is an A.C. signal proportional to the difference in intensity between the two beams and at twice the rotation frequency of the polarizer 19. This A.C. signal is transmitted through an A.C. amplifier 22 to a detector 23 which also receives a reference signal from the generator 24 utilized to drive the polarizer rotation motor 25. The output of the detector 23, after low pass filtering in RC network 23', is a D.C. signal, the amplitude of which is proportional to the intensity of the difference signal and the sign of which is dependent upon which of the components 16" or 17" is the more intense. This D.C. signal is transmitted to the piezoelectric transducer 14 which changes the distance between the mirrors 12 and 13 to tune the resonant circuit of the laser to maintain it on the center frequency at which the components 16" and 17" are equal in magnitude.

Heretofore the motor 25 has been bulky and heavy and, in addition, this system has required a separate generator means 24 for driving the motor 25 and for also providing the signal which serves to synchronize the rotation of the polarizer 19 with the incoming A.C. signal to the detector 23.

Figure 3:
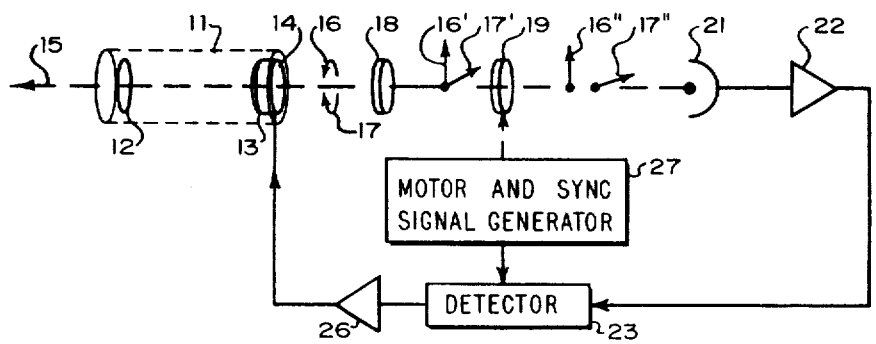
FIG. 3 is a block diagram of the intensity difference stabilization technique utilizing the novel polarizer rotating motor of the present invention.

In the present invention as shown in FIG. 3, a simple apparatus 27 is employed to rotate the polarizer 19 and to also generate the synchronizing signals for use by the detector 23 in producing the D.C. error signal applied to the piezoelectric transducer 14.

Figure 4:
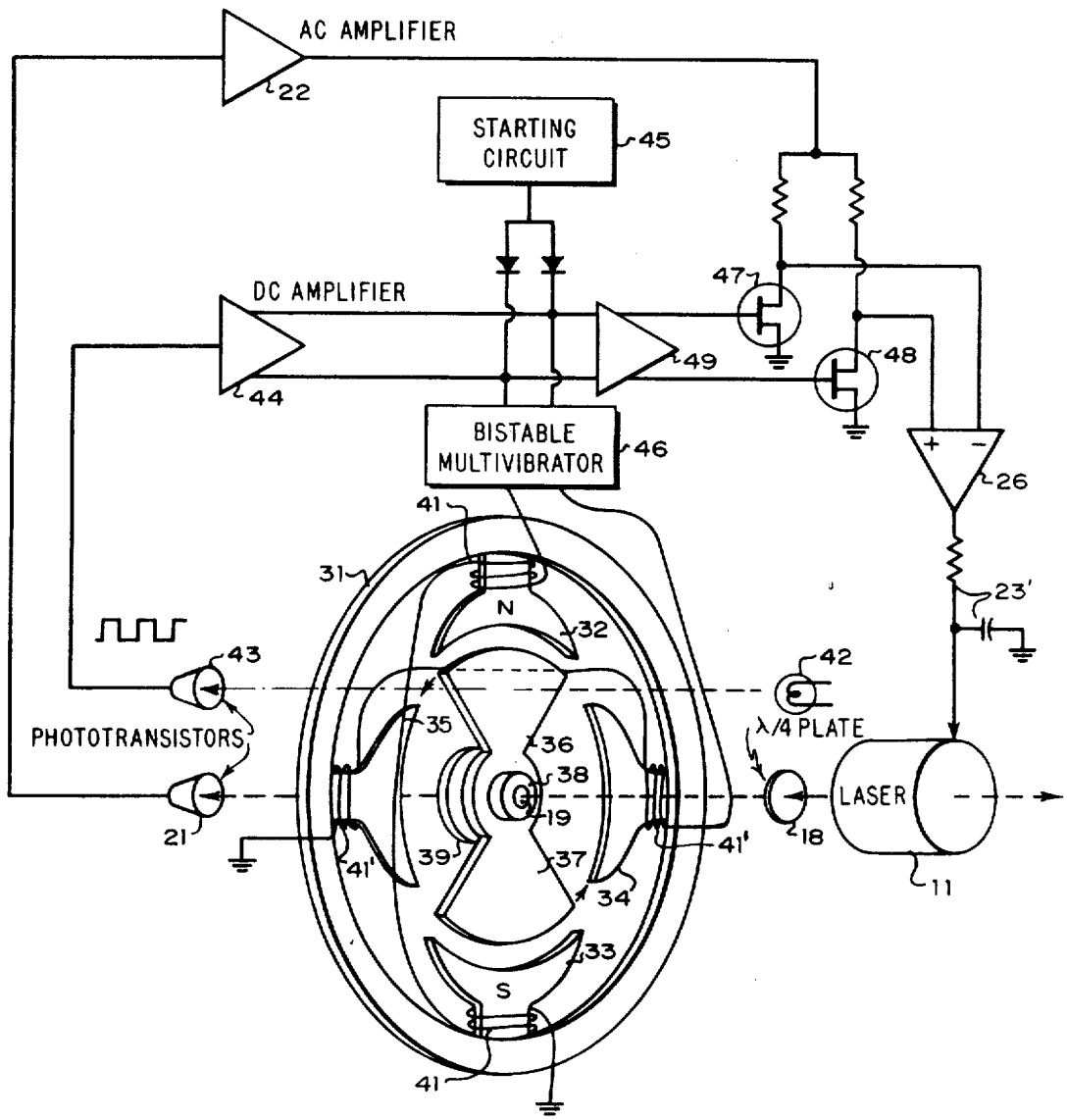
FIG. 4 is a schematic diagram illustrating the D.C. motor and detector circuitry of the present invention.

Referring now to FIG. 4, there is shown a schematic diagram of the novel motor apparatus of the present invention comprising a closed yoke 31 and four inwardly extending poles 32, 33, 34 and 35 spaced at 90° intervals about the yoke. The yoke and poles are made of soft iron. The inner ends of the poles flare out and form an arch-shaped inner surface. The rotor of the motor is butterfly shaped, the two soft iron vanes 36 and 37 being 90° segments of a circle and extending in opposite directions from a hollow rotor shaft 38 of brass to which the vanes are fixedly secured. The rotor structure including the two vanes 36 and 37 and the hollow shaft 38 are rotatably mounted in a bearing 39 for rotation about the axis of the hollow shaft. Electrical coils 41' surround each of the motor poles, the windings of two opposite poles of each pair being connected in series such that a D.C. current passing through the two windings will create a north pole at one pole and a south pole at the opposite pole.

A small light source 42 such as an infrared emitting diode or an incandescent bulb produces a beam of light directed through the yoke structure of the motor and onto a photocell 43 on the opposite side of the motor. The light source 42 and photocell 43 are positioned so that the light beam is interrupted by the vanes of the rotor twice on each revolution of the rotor, the beam being interrupted and uninterrupted for equal periods of time. The symmetrical pulse output of the photocell 43 is transmitted to a D.C. amplifier 44 which produces a noninverted pulse output and an inverted pulse output. These two outputs are coupled to a motor winding control circuit including the start circuit 45 and a bistable multivibrator circuit 46, the bistable multivibrator (or flip-flop) circuit 46 operating to transmit current to one or the other of the windings of the pairs of poles 32 and 33 or 34 and 35. For example, the noninverted pulse output results in current flow to the series connected windings 41 of one pair of opposite poles 34 and 35 to create a north and south pole during the period of energization by the on state of the amplifier output. The inverted output from D.C. amplifier 44 results in current flow to the series windings 41 of the other pair of opposite poles 32 and 33 and create a north and south pole across these two poles when energized by the on state of the amplifier output pulses. Thus the two pairs of opposite poles are energized alternately and, when energized, attract and rotate the soft iron butterfly rotor vanes 36 and 37. The start circuit 45 serves as described below to insure proper starting of the motor.

A polarizer sheet 29 is secured across the opening in the hollow rotor shaft 38 and in alignment with the beam passing through the quarter wave plate 18 from the laser 11. As the rotor rotates, the polarizer 19 converts the two orthogonal beam components from the quarter wave plate 18 into the time-spaced linear by polarized components 16" and 17".

These linearly polarized beam components are detected by the photocell 21, the A.C. output of the photocell being transmitted through an A.C. amplifier 22 to the detector circuit 23 comprising the two FET switches 47 and 48. The gate of FET switch 47 is connected through a buffer amplifier 49 to the inverted output of D.C. amplifier 44 while the gate of FET switch 48 is connected to the noninverted output of the D.C. amplifier 44. These FET switches 47 and 48 will be turned on alternately in synchronism with the rotation of the polarizer sheet 19, each FET shunting the associated input to a D.C. amplifier 26. The resultant positive or negative voltage output from D.C. amplifier 26 after low pass filtering in R.C. network 23' serves to control the piezoelectric transducer 14 in the laser and thus tune the laser cavity resonator.

It can be seen that this simple D.C. motor apparatus performs both functions of rotating the polarizer sheet 19 and simultaneously generating the signals for the detector 23 to synchronously switch the output from the photocell 21 to the amplifier 26 to provide the proper signed error signal to the piezoelectric cavity tuning transducer 14.

Figure 5:
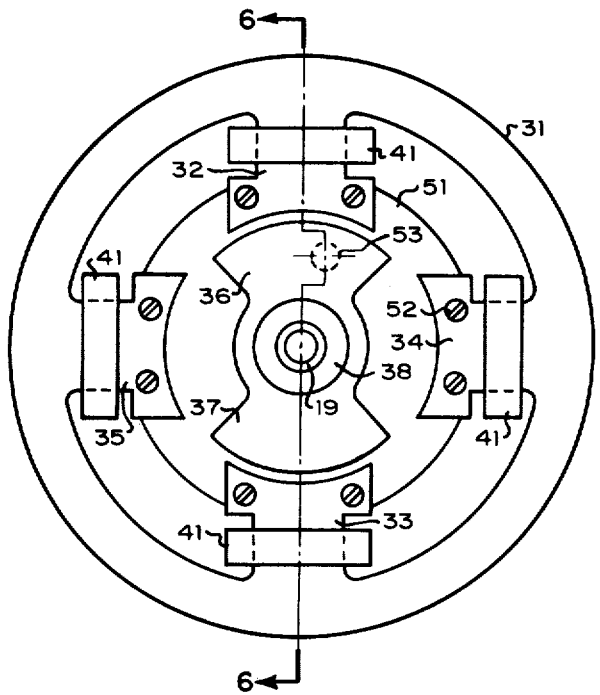
FIG. 5 is a plan view of a preferred structure of the motor of the present invention.
Figure 6:
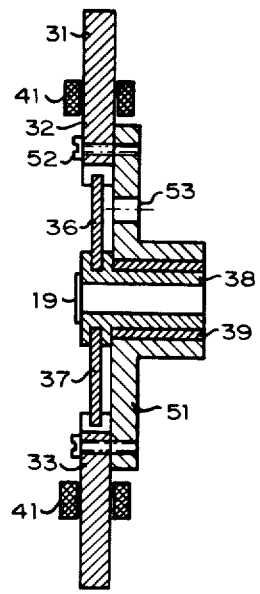
FIG. 6 is a cross section view of the motor of FIG. 5 taken through section line 6—6 therein.

Referring now to FIGS. 5 and 6, there is shown one preferred embodiment of the D.C. motor structure which comprises an annular yoke 31 of good magnetic material which serves to mount the motor device at the end of the laser structure. The yoke 31 supports the four inwardly directed poles 32 to 35 made of soft iron and having the electrical windings 41' mounted thereon. A support frame 51 made of aluminum is mounted within the yoke structure by means of screws 52. A hollow brass rotor shaft 38 is rotatably mounted in the center of frame 51 by means of a bearing 39, the brass shaft having securely affixed thereto the butterfly shaped soft iron rotor 36, 37, the polarizer sheet 19 being secured over the open end of the hollow shaft. A small opening 53 is located in the frame 51 and positioned so as to be covered at times by the rotating vanes 36, 37 as they rotate about the axis of the shaft 38, this opening serving to pass the light beam between the light source 42 and the photocell 43 shown in FIG. 4. One motor constructed as shown herein was approximately 3 inches in diameter, one-half inch thick, and weighed less than a quarter of a pound. This brushless D.C. motor has a low mass and low vibration, is very inexpensive, is self-starting and rotates at approximately 1,500 rpm.

Figure 7:
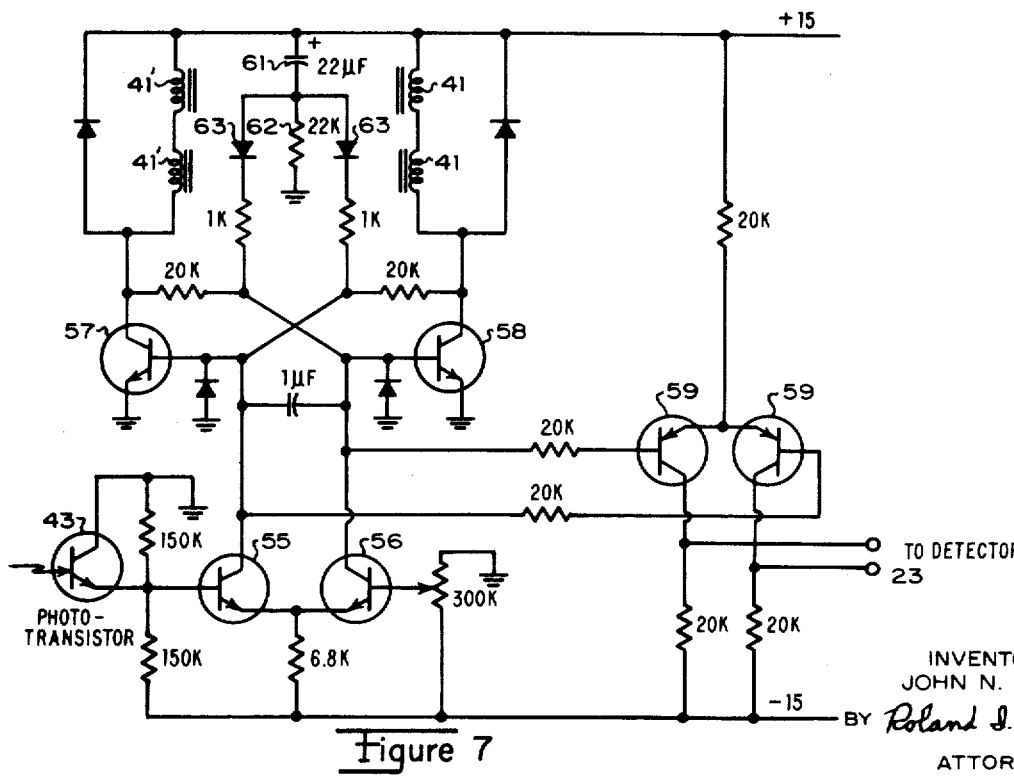
FIG. 7 is a schematic diagram of a preferred form of motor control circuitry.

Referring now to FIG. 7, there is shown one preferred form of motor winding control circuit comprising a differential amplifier circuit including transistors 55 and 56 coupled to the photocell 43. Transistor 55 becomes alternately conducting and nonconducting responsive to the pulse input from photocell 43. When it is conducting, it turns transistor 57 in the flip-flop circuit off, which in turn causes transistor 58 to turn on and conduct current through the motor windings 41. When transistor 55 is not conducting, transistor 56 conducts and turns transistor 58 off and transistor 57 on, causing current to now flow in motor windings 40'. Transistors 59 serve to form the buffer amplifier 49.

To insure that the motor will start up without fail each time it is activated, a starting circuit including the capacitor 61, resistor 62, and diodes 63 is provided. When supply voltage is first closed to the motor circuit, current will flow through the capacitor 61 to charge it up. This current will flow through the diodes 63 to the bases of transistors 57 and 58 which are both turned on to energize windings 41 and 41'. Energizing both pairs of poles causes the rotor to move to a position between the poles so that, after capacitor 61 has charged up and the current flow through the circuit to the bases of transistors 57 and 58 is terminated, the rotor will positively be attracted to the pair of poles first energized in response to the output from one or the other of the outputs of the differential amplifier 44.

Although one light source 42 and photodetector 43 have been shown for sensing rotor position, it should be understood that there are other ways to accomplish the desired result. For example, two light beams and a pair of photodetectors spaced apart by 90° of rotation may be employed, the two photodetector outputs being applied to opposite sides of the differential amplifier 55, 56.

I claim:

1. A laser tuning apparatus for tuning a laser resonant cavity which produces an output beam having two frequency components circularly polarized in opposite directions along an optical axis, the apparatus comprising:

tuning means for tuning the laser resonant cavity to at least a preselected frequency;
a polarizer situated on the optical axis;
a quarter wave plate situated on the optical axis between the polarizer and the laser resonant cavity;
rotor means for producing relative rotational movement between the quarter wave plate and the polarizer for converting the two circularly polarized components into two orthogonal time spaced linearly polarized components; electromagnetic means for creating a moving magnetic field for rotating the rotor means;
sensing means for sensing the rotation of the rotor means and giving an output signal proportional thereto;
circuit means connected to the electromagnetic means and the sensing means for causing the magnetic means to produce the moving magnetic field in response to the output of the sensing means;
first photodetecting means situated on the optical axis for producing an A.C. output signal proportional to the difference in intensity between the time spaced linear components; and
synchronous detecting means having inputs connected to the first photodetecting means, and the sensing means and having an output connected to the tuning means for producing a control signal in response to the synchronysm between the rotation of the rotor means and the time spaced linear components for tuning the laser resonant cavity to stabilize the laser output.

2. A laser tuning apparatus as claimed in claim 1 wherein said rotor means comprises a hollow shaft, said polarizer being secured in alignment with the axial opening in the shaft through which said laser beam passes.

3. A laser tuning apparatus as claimed in claim 1 wherein the electro-magnetic means comprises a plurality of pairs of opposed poles, each pole having an electrical winding coupled thereto, the windings of opposed poles being connected to produce opposite polarities at the two associated poles, the circuit means being operated to energize said pairs of poles sequentially to produce said moving magnetic field.

4. A laser tuning apparatus as claimed in claim 3 wherein said plurality of pairs of poles comprises two pairs, the pairs of poles being orthogonally positioned relative to one another.

5. A laser tuning apparatus as claimed in claim 4 wherein said rotor comprises a pair of vanes of magnetic material.

6. A laser tuning apparatus as claimed in claim 3 wherein the sensing means comprises a light source, second photodetecting means and a first amplifier circuit coupled through the circuit means to said windings, and wherein the synchronous detecting means includes a second amplifier circuit coupled to said detector means, the beam of light from said source impinging on said second photodetecting means to create an output therefrom, said rotor at times intercepting said light beam to terminate the output from said second photodetecting means, said amplifier circuits being responsive to the energization and de-energization of said second photodetecting means for energizing said pairs of poles sequentially to produce rotation of said rotor and for operating said synchronous detecting means to synchronize the rotation of said motor with said first photodetector A.C. output.

7. A laser tuning apparatus as claimed in claim 6 wherein said plurality of pairs of poles comprises two pairs, the pairs of poles being orthogonally positioned relative to one another.

8. A laser tuning apparatus as claimed in claim 7 wherein said rotor means comprises a pair of vanes of magnetic material, the beam of light from said source being directed past said vanes and at times being intercepted by said vanes during rotation of said rotor means.

9. A laser tuning apparatus as claimed in claim 6 wherein the circuit means includes a bistable multivibrator circuit, one output of said multivibrator being coupled to the winding of one of said pairs of poles and the other output of said multivibrator being coupled to the windings of another of said pairs of poles, and starting means coupled to said poles for at times simultaneously energizing said pairs of poles.

10. A laser tuning apparatus as claimed in claim 6 wherein said rotor means comprises a hollow shaft, said polarizer being secured in alignment with the axial opening in the shaft through which said laser beam passes.

* * * * *

UNITED STATES PATENT OFFICE
CERTIFICATE OF CORRECTION

Patent No. 3,701,042       Dated October 24, 1972

Inventor(s) John N. Dukes

It is certified that error appears in the above-identified patent and that said Letters Patent are hereby corrected as shown below:

Column 1, line 9, after "frequency output" insert -- beams --;

Column 3, line 49, after "Electrical coils" insert -- 41 or --;

Column 4, line 6, "41" should read -- 41' --; line 8, "on" should read -- ON --; line 8, after "output" insert -- , i.e. the time periods the illumination of photocell 43 is interrupted by rotor vanes 36 and 37 --; line 11, "create" should read -- creates --; line 13, "on" should read -- OFF --; line 13, before "amplifier" insert -- DC --; line 13, after "amplifier" insert -- 44 --; line 13, after "pulses" insert -- , i.e. during the time periods of illumination of photocell 43 --; line 20, "29" should read -- 19 --; line 25, "linear by" should read -- linearly --; line 57, after "windings" insert -- 41 and --;

UNITED STATES PATENT OFFICE
CERTIFICATE OF CORRECTION

Patent No. 3,701,042      Dated October 24, 1972

Inventor(s) John N. Dukes

It is certified that error appears in the above-identified patent and that said Letters Patent are hereby corrected as shown below:

Column 5, line 22, "40'" should read -- 41' --; line 65, cancel "electro-"; line 66, cancel "magnetic" and insert -- electromagnetic -- as the beginning of a new paragraph;

Column 6, line 5, "mag-" should read -- electromag- --; line 67, cancel "means".

Signed and sealed this 24th day of April 1973.

(SEAL)
Attest:

EDWARD M. FLETCHER, JR.    ROBERT GOTTSCHALK
Attesting Officer    Commissioner of Patents